United States Patent
Suh et al.

(10) Patent No.: US 7,435,939 B2
(45) Date of Patent: Oct. 14, 2008

(54) DYNAMIC OPTICAL PHASE SHIFTER COMPENSATOR

(75) Inventors: SeongWoo Suh, Mount Olive, NJ (US); Yossi Corem, Beit Shemesh (IL)

(73) Assignee: XTELLUS Inc., Morris Plains, NJ (US)

( * ) Notice: Subject to any disclaimer, the term of this patent is extended or adjusted under 35 U.S.C. 154(b) by 164 days.

(21) Appl. No.: 10/556,308

(22) PCT Filed: May 9, 2004

(86) PCT No.: PCT/IL2004/000388

§ 371 (c)(1),
(2), (4) Date: Nov. 8, 2006

(87) PCT Pub. No.: WO2004/099860

PCT Pub. Date: Nov. 18, 2004

(65) Prior Publication Data

US 2007/0146863 A1 Jun. 28, 2007

Related U.S. Application Data

(60) Provisional application No. 60/500,307, filed on Sep. 5, 2003.

(51) Int. Cl.
*G02F 1/01* (2006.01)
(52) U.S. Cl. .................. 250/216; 359/279; 359/256
(58) Field of Classification Search .......... 250/216, 250/221, 201.1, 201.9, 225, 229; 359/279, 359/246, 249, 256; 385/3, 11
See application file for complete search history.

(56) References Cited

U.S. PATENT DOCUMENTS

| 6,825,966 B2 * | 11/2004 | Webb et al. ................ 359/279 |
| 7,039,259 B2 * | 5/2006 | Corem et al. ................ 385/3 |
| 2002/0080467 A1 | 6/2002 | Damask |
| 2003/0090775 A1 | 5/2003 | Webb |

FOREIGN PATENT DOCUMENTS

| WO | WO-02/071133 A2 | 9/2002 |
| WO | WO-02/071660 A2 | 9/2002 |
| WO | WO-03/009054 A2 | 1/2003 |
| WO | WO-03/009073 A1 | 1/2003 |

* cited by examiner

*Primary Examiner*—Kevin Pyo
(74) *Attorney, Agent, or Firm*—Morrison & Foerster LLP (57) ABSTRACT

A birefringent, electrically-controlled, wavelength selective, pixelated optical phase shifting device, in which the correct drive voltage for a desired phase shift through any pixel can be determined independently of changes in the drive voltage arising from changes in the environmental conditions, generally temperature. This is achieved by mounting a monitor phase shifting element controlled by its own drive voltage, in close proximity to the pixelated phase shifter, such that the monitor element and the phase shifter experience the same environmental condition. A probe optical beam of predefined wavelength is directed through the monitor element, and the transmitted beam measured as a function of the monitor drive voltage. This functional relationship is used to define the environmental condition in which the monitor element and the phase shifter, are situated, and the correct drive voltage for application to any phase shifter pixel can be determined.

36 Claims, 5 Drawing Sheets

DYNAMIC OPTICAL PHASE SHIFTER COMPENSATOR

REFERENCE TO RELATED APPLICATION

This application is a national stage of PCT/IL2004/000388 which was published on Nov. 18, 2004 and which claims the benefit of priority to U.S. Application No. 60/500,307 filed May 9, 2003.

FIELD OF THE INVENTION

The present invention relates to the field of the stabilization of optical devices utilizing the properties of phase shifting or polarization rotation elements, such as liquid crystal elements, especially for use as signal processing, switching or routing devices in optical communication applications.

BACKGROUND OF THE INVENTION

Many devices for use in optical communication networks utilize liquid crystal (LC) elements for performing signal modulation functions, generally by means of changing the phase between the ordinary and the extraordinary components of the optical beam transmitted through the element, and hence the polarization direction of the beam, which is generally input with a known polarization. In the prior art there are described numerous examples of such applications, including for instance, those described in PCT Application No. PCT/IL/02/00511 for Wavelength Selective Optical Switch, and in PCT Application No. PCT/IL/02/00188 for Fiber Optical Attenuator, published as WIPO document WO 02071133, and in PCT Application No. PCT/IL/02/00187 for Dynamic Gain Equalizer, published as WIPO document WO 02071660, and in PCT Application No. PCT/IL/02/00167 for Fiber Optical Gain Equalizer, published as WIPO document WO 03009054, all of which are incorporated herein by reference, each in its entirety.

The modulation efficiency of such devices, and especially, the blocking efficiency of such devices used as optical switches, is dependent on the generation of accurate phase differences between the components of the processed optical signals. In particular, it is often necessary to generate an exact phase difference between two components of an optical beam, in order to provide a desired polarization rotation and signal blocking. Any deviation from this phase shift results in degradation in the performance of the device.

In birefringent media, such as in liquid crystal devices, the phase shift between the ordinary and extraordinary beams generated in passage through a pixel of the element is dependent on the ordinary and extraordinary refractive indices respectively $n_o$ and $n_e$, and is given by the expression:

$$\Delta\phi = \Delta n \cdot d \cdot 2\pi/\lambda \quad (1)$$

where:
- d is the path length through the birefringent medium, generally the liquid crystal thickness,
- $\lambda$ is the wavelength of the light passing through the pixel, and
- $\Delta n = (n_o - n_e)$ is the difference between the ordinary and the extraordinary refractive indices of the liquid crystal material, arising from the birefringence of the material. The value of the phase shift $\Delta\phi$ is known as the birefringence, B, of the material of the pixel, because of the origin of the phase shift, though the term birefringence is also sometimes used for the value of $\Delta n \cdot d$ only.

The difference $\Delta n$ can be positive or negative, depending on the type of liquid crystal material used. For a negative nematic LCD, $n_o > n_e$, for a positive nematic LCD, $n_e > n_o$. In normal use, the phase shift through any pixel of the liquid crystal element can be changed by varying the applied drive voltage across that pixel, which is operative to change the value of $n_e$ as a function of the applied voltage. Many types of devices are in existence using these principles.

It is apparent from equation (1) that the phase shift generated is directly dependent on the wavelength $\lambda$, and as the wavelength changes, the phase shift also changes. Consequently, each particular wavelength being switched requires a different applied voltage to ensure that the desired phase difference, for instance of exactly $\pi$, is generated for that wavelength. Since in general, in wavelength dispersed applications, the optical channel for each particular wavelength passes through a separate, spatially given pixel, this is readily achieved by ensuring that each pixel has the correct switching voltage applied to provide the desired phase shift, generally exactly $\pi$, for that particular wavelength. A look-up table of the required switching voltages as a function of wavelength can be stored in the device control system. So long as environmental conditions remain constant, the values of the phase shift $\Delta\phi$ between pixels associated with different wavelengths can be related by means of the linear dependence on wavelength shown in equation (1).

However, this simple picture is complicated by the fact that the values of $n_o$ and $n_e$ are not generally singly-defined functions, as would appear to be from the simple formulation of equation (1), but also vary with ambient conditions, such as the temperature of the material. This variation in itself could also be accommodated, by providing environmental stabilization of the optical switching device, such as by means of a built-in thermo-electric cooler (TEC) or a heater. The control input to such a TEC or heater may be obtained by measurement of the temperature of the phase shifting element, such as by incorporating a thermistor or a thermocouple. Because of the size of the complete device, this solution, however, requires a comparatively large thermoelectric cooler or a comparatively large heater in order to maintain the desired temperature. This solution is therefore complex, and requires increased power consumption to drive the temperature stabilizing device, especially for a TEC, thus increasing the cost of what should be an otherwise simple device.

However, even the above description of the dependence of the phase shift from equation (1) on wavelength and environmental temperature is incomplete, since it is known that $n_o$ and $n_e$ themselves also vary with the wavelength of the light passing through the medium. The resulting phase shift, as a function of the voltage applied to a specific pixel, thus becomes a more complex function of temperature and wavelength, and even more so because there is also a voltage effect on $n_e$ as well. Equation (1) should thus be more fully written as:

$$\Delta\phi = [n_o(T,\lambda) - n_e(T,\lambda,V)] \cdot d \cdot 2\pi/\lambda \quad (2)$$

where the functional forms of $n_e$ and $n_e$ are generally different. Calculation of the correct voltages for each pixel, taking into account the functional interaction of all of the various elements of equation (2), by means of predetermined corrections for all envisaged conditions, thus becomes a complex procedure.

There therefore exists a need for a simply applied method of providing environmental compensation of optical devices based on birefringent phase shifting properties, such that the voltage required for obtaining a specific phase shift through any pixel, generally that required for maximum blocking or for maximum transmission, can be determined, even when the functional dependence of the refractive indices of the birefringent material on environmental conditions are not known.

The disclosures of each of the publications mentioned in this section and in other sections of the specification, are hereby incorporated by reference, each in its entirety.

SUMMARY OF THE INVENTION

The present invention seeks to provide a novel optical device, based on the birefringent properties of an electrically-controlled, wavelength selective, pixelated phase shifter, in which the correct drive voltage for a desired phase shift through any pixel can be determined independently of changes in the drive voltage required because of changes in the environmental conditions present. This is preferably achieved by mounting one or more birefringent monitor phase shifting elements, each controlled by its own drive voltage, in close proximity to the pixelated phase shifter, such that the monitor element and the phase shifter experience essentially the same environmental condition. Alternatively and preferably, one of the pixels of the phase shifter itself can be chosen to function as the monitor element. A probe optical beam from a predefined wavelength source, preferably a diode laser, is directed through the monitor element, and the transmitted beam measured as a function of the monitor drive voltage, preferably by means of a pair of crossed or parallel polarizing plates, depending on which configuration is preferred, and a detector. In the case where one of the pixels of the phase shifter is operative as the monitor element, the probe wavelength is then preferably that appropriate to the position of the monitor element in the phase shifter array. The functional relationship between the transmission, T, through the monitor element and the applied voltage, V, known hereinafter as the T/V curve, is used to define the environmental condition in which the monitor element, and hence also the phase shifter, are situated, since this functional relationship changes according to the environmental condition. Once this environmental condition has been defined by means of the monitor element, the drive voltage applied to a specific phase shifter element in the pixelated phase shifter can be determined, according to a first preferred embodiment of the present invention, by means of the linear wavelength relationship that exists for any specific conditions, between the phase shift associated with the monitor element operating at the probe wavelength, and that associated with any of the other elements operating at a different wavelength, as defined by equation (1) above. This relationship can therefore be used to compensate for the change in phase shift caused by change in the environmental condition, and thus to set the phase shift to its desired value. The use of equation (1), with its linear dependence on wavelength, instead of the more accurate equation (2), provides a first order compensation method, which for most practical applications is sufficient, since the other effects causing lack of linearity in equation (2) are generally small.

The correction is preferably performed by first determining the optical transmission of the one or more monitor phase shifting elements as a function of applied drive voltage, at the ambient temperature of the device, where temperature is taken as an example of the most usual environmental condition which affects the performance of such birefringent phase shifters, primarily by the effect of the temperature on the ordinary and extraordinary refractive indices of the birefringent material of the device. Once the T/V curve for the monitor element(s) has been determined at the probe wavelength, the T/V curve is also known under these same environmental conditions, for any of the wavelength specific pixels of the main phase shifter, because of the known relationship between the performance of the device at different wavelengths. By repeating the probe wavelength monitor measurement periodically, this method tracks temperature changes in the device, and thus enables the T/V curve to be accurately determined for any other wavelength, independently of changes in temperature.

The compensation mechanism afforded by this invention can preferably be applied to a multi-channel wavelength selective switch, in which, depending on the type of switch mechanism, either the blocking action or the level of the open insertion loss, is dependent on the achievement of an exactly predetermined phase shift, generally $\pi$. Departure from this predetermined phase shift, due for instance to the above mentioned temperature effects, results in reduced switch performance, in terms of reduced blocking attenuation when the switch channel is closed, or increased insertion loss when open.

The above-described embodiments of the present invention preferably utilize a probe beam having a single predetermined wavelength. According to further preferred embodiments of the present invention, a tunable source is used to generate a family of T/V curves for the monitor element, for a number of wavelengths, preferably spaced over the range of wavelengths covered by the pixelated phase shifter. These T/V curves for each wavelength preferably comprise the values of the attenuation measured for different applied drive voltages, preferably over the whole of the dynamic range of the device using the element. Once such a family of curves has been recorded and stored in the system memory, the drive voltage necessary to generate any desired attenuation level in any desired wavelength pixel of the element can be directly determined from the stored family of curves. This equivalence of the T/V curves between monitor and phase shifter pixels is possible because both are arranged to be situated in the same environmental conditions.

New sets of the monitor element T/V curves are measured periodically and repeatedly, such that if and as the temperature of the device changes; and as a consequence of which, the T/V curves for each pixel of the phase shifter also undergo these temperature changes, the most recently recorded monitor measurements can be utilized to ensure correct selection of the operating voltage for the desired phase shift for any pixel at the new temperature.

There is thus provided in accordance with a preferred embodiment of the present invention, an optical device comprising:

(i) a plurality of birefringent phase shifter elements electrically controlled by applied drive voltages, the phase shift generated in an element for a given drive voltage being generally dependent on environmental conditions present, (ii) a probe optical beam of predefined wavelength, the probe optical beam being directed through at least one of the birefringent phase shifter elements, operative as a monitor element, (iii) a detector for determining the transmission of the probe optical beam through the monitor element as a function of the drive voltage applied to the monitor element, and (iv) a controller utilizing an output of the detector to produce a predetermined phase shift in another one of the birefringent phase shifter elements.

The predetermined phase shift is preferably produced essentially independently of the environmental conditions, or at least with substantially reduced dependence on the environmental conditions, the environmental conditions preferably being at least the ambient temperature of the optical device. Additionally, at least one of the birefringent phase shifter elements may be a liquid crystal element. The monitor element may be mounted either on the same substrate as the other elements of the plurality of birefringent phase shifter elements, or it may be mounted on a separate substrate.

In the above described devices, the phase shift generated in one of the birefringent phase shifter elements is preferably operative to control the transmission of the element according to the drive voltage applied thereto. Also, if the detector is disposed opposite to the side of impingement of the probe optical beam on the monitor element, the optical device is transmissive. The drive voltage applied to the element is often chosen such as to cause the phase shift to be $\pi$, essentially independently of the environmental conditions.

Alternatively and preferably, the device may also comprise a reflecting surface disposed opposite to the side of impingement of the probe optical beam on the at least one monitor element, such that the optical device is a reflective optical device. In such a case, the drive voltage applied to the element is often chosen such as to cause the phase shift to be $\pi/2$, essentially independently of the environmental conditions.

In all of the above described devices, and in accordance with yet more preferred embodiments of the present invention, the probe optical beam of predefined wavelength may preferably be produced by a laser, which may more preferably be a tunable laser or a diode laser or a tunable diode laser. The system using the device may also comprise an etalon disposed such that an output wavelength of the tunable laser is determined accurately for at least one given lager temperature.

In accordance with still other preferred embodiments of the present invention, the probe optical beam of predefined wavelength may be produced by a broadband source with a tunable bandpass filter disposed serially in its output optical path. Furthermore, the probe optical beam may be derived remotely from the device, such as by means of a communication network monitor channel. Furthermore, the detector for determining the transmission of the probe optical beam through the monitor element may be located remotely from the device, and it too may be an externally provided communication network monitor channel detector.

There is further provided in accordance with still another preferred embodiment of the present invention, a method of dynamically compensating for the effect of an environmental condition on an optical phase shifter device, comprising the steps of:
(a) providing at least one birefringent phase shifting element, electrically controlled by an applied drive voltage, the phase shift generated in the element for a given drive voltage being dependent on the environmental condition present,
(b) providing at least one monitor birefringent phase shifting element controlled by a monitor drive voltage, the at least one monitor element experiencing essentially the same environmental condition as the at least one birefringent phase shifter element,
(c) measuring a relationship between the monitor drive voltage and the transmission through the at least one monitor) element for a predetermined wavelength, and
(d) determining from the relationship, the drive voltage required by the at least one birefringent phase shifting element, to obtain a desired optical transmission for a wavelength other than the predetermined wavelength.

In the above described method, the step of determining from the relationship is preferably performed by calculating a set of the relationships between the monitor drive voltage and the transmission through the at least one monitor element for a plurality of wavelengths different from that of the predetermined wavelength. Additionally, the step of calculating a set of relationships between the monitor drive voltage and the transmission through the at least one monitor element for a plurality of wavelengths different from that of the predetermined wavelength is preferably performed by utilizing a linear relationship between the phase shift generated in the at least one birefringent phase shifter element and the wavelength of light traversing the element. Furthermore, the transmission through the at least one monitor element is preferably determined from the phase shift generated in the at least one birefringent phase shifter element by use of the functional relationship between the transmission through the birefringent element and the birefringence phase shifting effect on light transmitted therethrough. In any of the last mentioned preferred methods, the desired optical transmission through the at least one birefringent phase shifter element is produced essentially independently of the environmental condition, or at least with substantially reduced environmental dependence.

In accordance with a further preferred embodiment of the present invention, the above methods may preferably also comprise the step of periodical repetition of steps (c) and (d) to compensate for changes in the environmental condition occurring between the periodical repetitions.

At least one of the at least one birefringent phase shifter element, and the at least one monitor element, may be a liquid crystal element. Furthermore, the at least one monitor element may either be mounted on the same substrate as the at least one birefringent phase shifter element, or on a separate substrate.

In any of the above-described methods, the environmental condition may be at least the ambient temperature of the optical device. Additionally, the phase shifter device may be a transmissive or a reflective device.

Furthermore, in accordance with yet another preferred embodiment of the present invention, in the above described method, the step of measuring a relationship between the monitor drive voltage and the transmission through the at least one monitor element for a predetermined wavelength is preferably performed using a laser, which is more preferably a tunable laser or a diode laser or a tunable diode laser. The laser may even be located remotely from the device.

There is also provided in accordance with a further preferred embodiment of the present invention, a method of dynamically compensating for the effect of an environmental condition on an optical phase shifter device, comprising the steps of:
(a) providing at least one birefringent phase shifting element, electrically controlled by an applied drive voltage, the phase shift generated in the element for a given drive voltage being dependent on the environmental condition present,
(b) providing at least one monitor birefringent phase shifting element controlled by a monitor drive voltage, the at least one monitor element experiencing essentially the same environmental condition as the at least one birefringent phase shifter element,
(c) measuring relationships between the monitor drive voltage and the transmission through the at least one monitor element for a plurality of predetermined wavelengths, and
(d) using the relationships to determine the drive voltage required by the at least one birefringent phase shifting element, to obtain a desired optical transmission for any desired wavelength within the range of the plurality of wavelengths.

In this method, the desired wavelength may either be one of the plurality of predetermined wavelengths, or it may not be one of the plurality of predetermined wavelengths, in which case, the desired optical transmission is determined by calculation from at least one of the relationships at at least one of the predetermined wavelengths. Also, in this method, the desired optical transmission through the at least one birefringent phase shifting element is preferably produced essentially independently of the environmental condition.

In accordance with further preferred embodiments of the present invention, the above methods may preferably also comprise the step of periodical repetition of steps (c) and (d) in order to compensate for changes in the environmental condition occurring between the periodical repetitions.

At least one of the at least one birefringent phase shifter element, and the at least one monitor element, may be a liquid crystal element. Furthermore, the at least one monitor element may either be mounted on the same substrate as the at least one birefringent phase shifter element, or on a separate substrate.

In any of the above-described methods, the environmental condition may be at least the ambient temperature of the optical device. Additionally, the phase shifter device may be a transmissive or a reflective device.

In accordance with yet another preferred embodiment of the present invention, in the previously described methods, the plurality of predetermined wavelengths may preferably be produced by a laser or more preferably by a tunable laser or a diode laser or a tunable diode laser. The laser may be located remotely from the device. Additionally, an etalon may preferably be used so that an output wavelength of the tunable diode laser is determined accurately for at least one given laser temperature.

Alternatively and preferably to the use of a tuned laser, the plurality of predetermined wavelengths may be produced by a broadband source with a tunable filter disposed serially in its output optical path.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
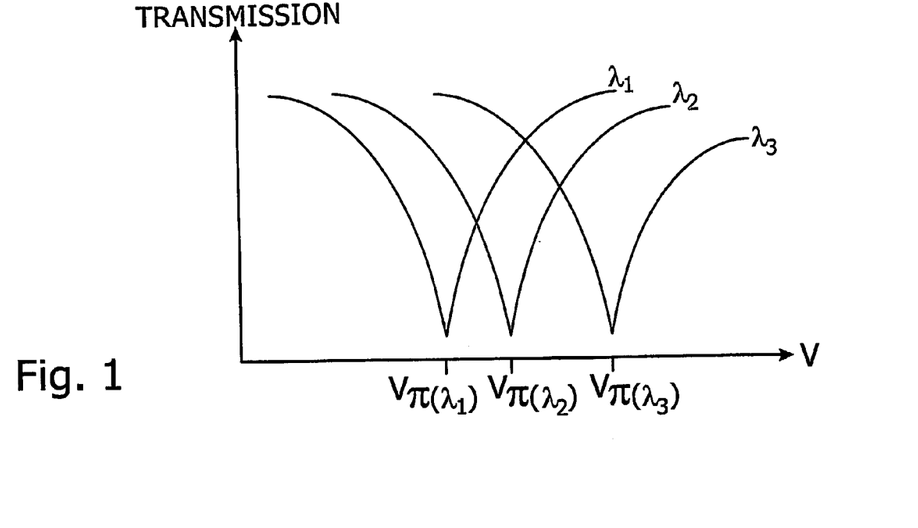
FIG. 1 is a graph schematically showing the optical transmission of a pixel of a liquid crystal switching device as a function of the voltage applied across the pixel, for various different wavelengths.

Reference is now made to FIG. 1, which is a graph schematically showing the optical transmission characteristics of pixels of a wavelength dependent switching device based on the phase shifting properties of a liquid crystal element, as a function of the voltage applied across the liquid crystal pixels. Each pixel has its own particular T/V curve, depending on the wavelength $\lambda_n$ transmitted by that pixel. The device is preferably of the type that for a given wavelength, at the predetermined voltage for that wavelength, the blocking is maximal when the phase shift $\Delta\phi$ through the pixel is exactly $\pi$, and the transmission thus shows a characteristic minimum point. This voltage is known as $V_\pi$. For different wavelengths, $\lambda_1 \lambda_2 \lambda_3 \ldots$ the value of $V_\pi$ is different, and is given by $V_{\pi(\lambda 1)}$, $V_{\pi(\lambda 2)}, V_{90\,(\lambda 3)} \ldots$, as determined by the functional relationship of equation (1). Alternative designs of such devices can be such that the transmission is maximal for the given phase shift, generally $\pi$. The operation of the device is thus generally to enable the provision of the correct value of $V_{90}$ for each switched wavelength channel, when demanded by the switching system. According to other modes of operation of the device, any pixel may be required to provide a phase shift such as to generate a predetermined attenuation level of the light passing through that pixel, and not just maximum or minimum attenuation. For such applications, a voltage other than $V_{90}$ has to be determined, according to the transmission level required through the pixel.

Figure 2:
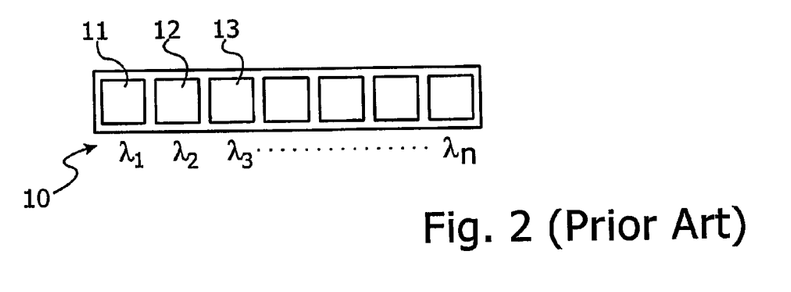
FIG. 2 illustrates schematically a one-dimensional pixelated liquid crystal array of a prior art dispersed spectrum switching device.

Reference is now made to FIG. 2, which is a schematic representation of a one-dimensional pixelated liquid crystal array 10 of a prior art, dispersed spectrum switching device, in which different wavelength channels $\lambda_1 \lambda_2 \lambda_3 \ldots \lambda_n$ of the light to be switched are directed to different pixels 11, 12, 13 of the liquid crystal element. Because of the variation of $V_\pi$ with wavelength, each separate pixel requires its own specific voltage to achieve the maximum channel blocking effect. The values of the voltages required are generally stored in a look-up table, and the required voltage applied to each pixel accordingly.

However, since the phase shift is also a function of the refractive indices, and these refractive indices are not constant but are themselves functions, inter alia, of the ambient temperature, the variation of $V_\pi$ with temperature for each specific wavelength pixel must also be known. In general, it is inconvenient to provide temperature stabilization or temperature measurement means for the device, and even if a temperature measurement were available, the inter-relations shown by equation (2) above would make correction of the voltage for each pixel and for any environmental condition a complex task.

Figure 3:
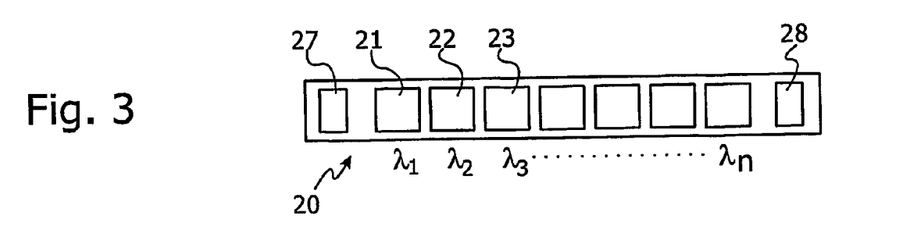
FIG. 3 illustrates schematically a one-dimensional pixelated liquid crystal phase-shift switching element, incorporating temperature compensating monitor pixels, constructed and operative according to a preferred embodiment of the present invention.

Reference is now made to FIG. 3, which illustrates schematically a one-dimensional liquid crystal switching element 20, incorporating a dynamic temperature compensating optical mechanism, constructed and operative according to a preferred embodiment of the present invention, and obviating the necessity of temperature stabilizing the entire switching device. FIG. 3 is a plan view of the element viewed from the direction of the light passage through the array. As with the prior art device of FIG. 2, different wavelength channels $\lambda_1$, $\lambda_2 \lambda_3 \ldots \lambda_n$ of the light to be switched are directed to different pixels 21, 22, 23 of the liquid crystal element. The element differs from the element of FIG. 2 by the addition of preferably one or two temperature compensation monitor pixels 27, 28, preferably located at one end or both ends respectively of the one dimensional array, or even on a separate element situated close to the array element 20. A probe laser beam, which is preferably at a wavelength within the band of operation of the device, but can also be selected to be outside that band, is directed through the monitor pixel, such as 27 for a preferred embodiment where there is only one monitor pixel, and the transmission of the monitor pixel determined as a function of the voltage applied to it. From this relationship, the value of $V_\pi$ for the monitor pixel can be obtained for the temperature conditions applicable at the time of the measurement. In the embodiment shown in FIG. 3, in order to simplify the explanation of the device, the monitor pixel is shown as a dedicated pixel 27 or 28, separate from the signal channel pixels 21, 22, 23, ... of the main device. However, it is to be understood that the monitor pixel can also be chosen as any one of the active pixels of the complete array, so long as the wavelength of the light passing through the selected monitor pixel is known and its transmission monitored. Alternatively and preferably, the monitor pixels 27 and/or 28 can be mounted separately from the array 20. This arrangement is particularly suitable when the probe source beam is obtained from the communication network on which the system incorporating the birefringent switching element is installed. System vendors typically provide one or more Optical Supervising Channels (OSC), or Optical Channel Monitors (OCM) operating at known fixed wavelengths, whose purpose is generally to confirm the functionality of the channel link. Since such an OSC or OCM is always accessible and at a known wavelength, the pixel of the array corresponding to the OSC/OCM wavelength can be used as the monitor pixel. The wavelength(s) of the provided OSC/OCM channel(s) must be known, and the signal level measured at the switch input and output. A system utilizing such OSC/OCM channel, according to this preferred embodiment of the present invention is described hereinbelow, in relationship to FIG. 7 below.

Figure 4:
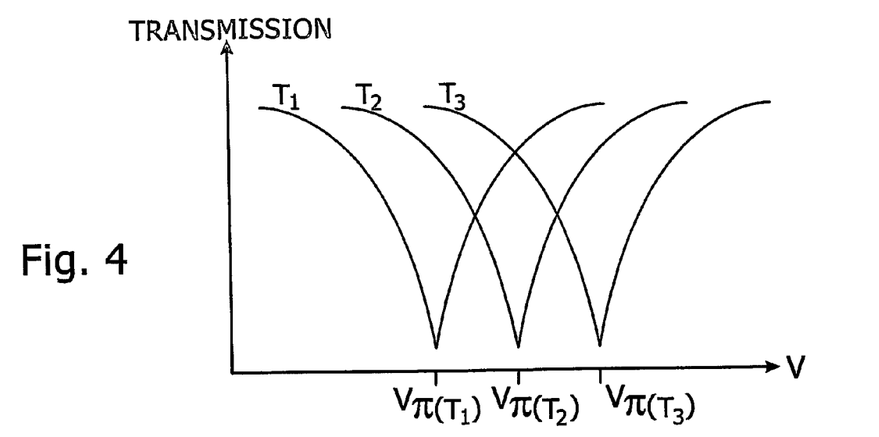
FIG. 4 is a graph schematically showing the optical transmission of a predetermined wavelength through the monitor pixel of a liquid crystal switching device of FIG. 3, as a function of the voltage applied across the monitor pixel, for a number of different temperatures.

Reference is now made to FIG. 4, which shows a plot of the transmission through the monitor pixel 27 as a function of the applied voltage V, for a number of different temperatures $T_1$, $T_2$, $T_3$ ..., and for a specific wavelength, being the wavelength of the monitor laser beam. Characterization of the device is thus dependent on knowing which of these different curves to use in order to apply the relevant control voltage to provide the desired transmission, without necessarily knowing the temperature itself.

Since the monitor pixel is located on the same element as the main array 20, the optical birefringent behavior of this monitor pixel should follow the same changes as the pixels in the main array with variations in environmental conditions. Thus, as the measured value of $V_\pi$ changes in the monitor pixel 27, for instance because of a change in temperature, which causes the T/V curve for any particular wavelength to move along the V-axis, and to change its shape, the level of transmission in each of the pixels 21, 22, 23, of the main array, and hence the values of $V_\pi$ therein also change accordingly. Each wavelength channel behaves somewhat differently because of the dependence of the transmission on wavelength, and thus each wavelength channel pixel has its own particular dependence of $V_\pi$ on temperature.

During use of the multi-channel switching device, the exact voltage to be applied to the pixel of any desired wavelength channel, for instance $V_\pi$ to obtain maximum blocking, is unknown, since the temperature of the pixel array is unknown. This problem can be solved, according to preferred methods of the present invention, by measuring the transmission of the probe laser light through the monitor pixel in real-time as a function of the applied monitor pixel voltages, from which the value of $V_\pi$ for the monitor can be obtained. These measurements are performed either on a continuous basis or on a repetitively sampled basis. Once the transmission of the monitor pixel has been thus characterized for its specific probe wavelength, the correct drive voltage for any other wavelength can be readily determined from the known relationship of the T/V curves as a function of wavelength. Furthermore, the appropriate drive voltage for any desired attenuation level for any pixel can also be readily determined from the know predetermined shape of the T/V curves. Since it is the birefringence, B, which has the known relationship described in equation (1) to the wavelength, and not the transmission, T, it is necessary to relate the T/V curves to the B/V curves in order to determine the required drive voltage for any given transmission at any wavelength. The method by which this is achieved is now explained.

As is known in the art, the normalized transmission, T, of a birefringent element between a pair of parallel polarizers is given by the expression:

$$T = \cos^2(B/2) \quad (3)$$

where B is the birefringence of the element. For a corresponding pair of crossed polarizers, the transmission is proportional to $\sin^2(B/2)$, such that a similarly shaped curve is obtained, but shifted in phase by $\pi/2$.

For each of the values of the transmission T as a function of the drive voltage V applied to a given pixel, the values of B can be found using the expression $B = 2 \cos^{-1}(T^{1/2})$, derived from equation (3) above.

Figure 5:
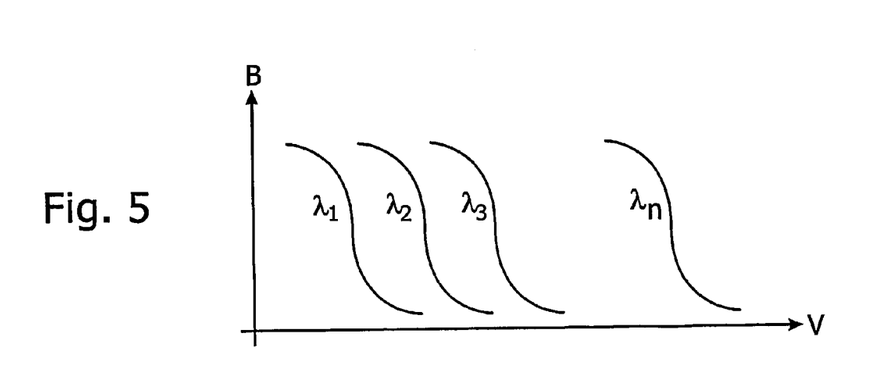
FIG. 5 is a plot of the birefringence of a pixel of a wavelength selective switching device, as a function of the drive voltage V applied to that pixel, for a number of specific channel wavelengths $\lambda_1 \lambda_2 \lambda_3 \ldots \lambda_n$.

Reference is now made to FIG. 5, which is a schematic plot of the birefringence of a pixel of the device, as a function of the drive voltage V applied to that pixel, for a number of specific channel wavelengths $\lambda_1 \lambda_2 \lambda_3 \ldots \lambda_n$. The value of the birefringence itself, $B_1$, for the wavelength $\lambda_1$ is given, according to the first of its commonly used definitions, by the known expression:

$$B_1 = 2\pi \cdot \Delta n \cdot d / \lambda_1 \quad (4)$$

Since the differential optical path shift, $\Delta n \cdot d$, through the element, is invariant for a given environmental condition and for a specific voltage, the values of B are thus seen from equation (4) to be inversely proportional to the wavelengths, $\lambda$. Thus, $$B_1\lambda_1 = B_2\lambda_2 = B_3\lambda_3 = \ldots B_n\lambda_n \tag{5}$$

Thus, using these expressions, it is seen that the birefringence generated at any wavelength $\lambda_2 \lambda_3 \ldots \lambda_n$ different from the wavelength $\lambda_1$ used in determining the monitor pixel curve, can be simply calculated as a function of the applied voltages V at each wavelength. Such a family of B/V curves is shown in FIG. 5, plotted for different wavelengths $\lambda_1 \lambda_2 \lambda_3 \ldots \lambda_n$.

Once this family of curves is known for the temperature in question, an equivalent family of curves showing the transmission through the element as a function of the applied voltage at each wavelength, such as those shown in FIG. 1, can be obtained using equation (3), or its sine equivalent, depending on the blocker design. Using this family of curves, the voltage required for any particular transmission value at any particular wavelength can be readily determined and applied to the element to generate the desired optical transmission at the temperature in question.

According to this preferred embodiment of the present invention, the above-described method is used in the phase-shifter switching array of FIG. 3 to compensate for unknown changes in temperature. The transmission behavior of the monitor element can be described by the curve for the specific wavelength at which the monitor probe beam is operating. From the transmission results obtained from the monitor element, the transmission curve, and hence the applied pixel voltage for any desired transmission value, can be obtained for any other desired wavelength. Since the monitor pixel is essentially at the same environmental conditions as all of the other pixels, the characterization performed by measurement on the monitor pixel bears a known relationship to the characterization calculated for the other wavelength channel pixels, as described above. In practical use, the measurement on the monitor element is repeated periodically, and a new set of transmission curves generated periodically, so that any changes in the environmental conditions occurring in the intervening period are taken into account by using the newest set of transmission measurements on the monitor element.

A second monitor pixel 28 at the opposite end of the array may preferably be used in order to ensure that the dynamic temperature compensation is performed relative to the mean temperature across the array, in situations where there may not be uniform temperature distribution within the device. In general, though, since the temperature within the device package is fairly constant, only one monitor pixel 27 is required. Furthermore, even though the monitor pixels have been described in the above embodiments as separately spaced from the main array pixels, or even on separate elements, it is to be understood that transmission of a probe beam through any of the pixels of the main array may also preferably be used as the monitor pixel channel.

Figure 6:
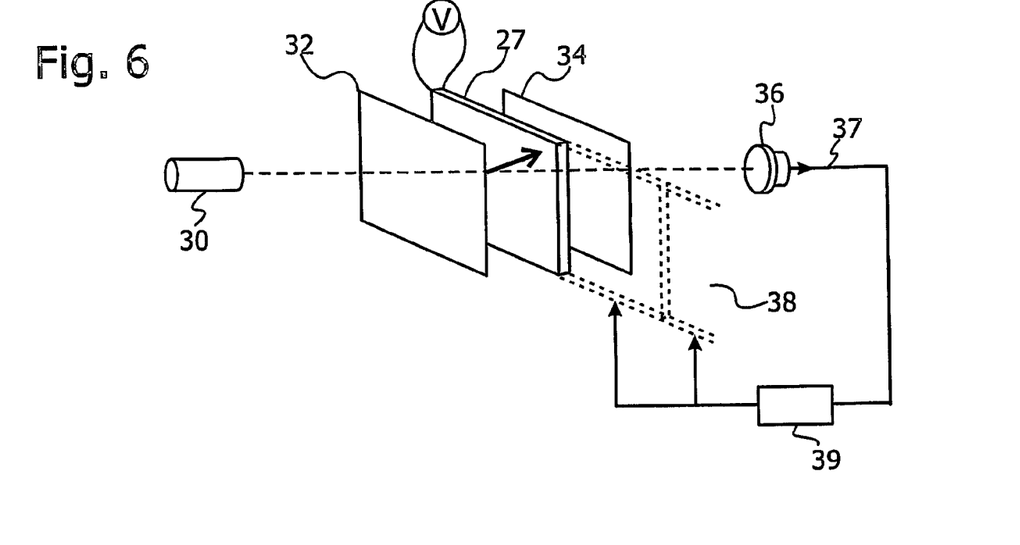
FIG. 6 is a schematic isometric view of the array of FIG. 3, showing the optical path through one of the monitor pixel elements.

Reference is now made to FIG. 6, which is an isometric view of the array of FIG. 3, showing the optical path through one of the monitor pixel elements 27. The probe light source 30 directs the probe beam through the monitor liquid crystal pixel element which is sandwiched between a polarizing element 32 and an analyzer 34. The differential phase shift through the monitor element, as represented by the polarization direction of the output light is varied by means of the voltage V applied across the monitor pixel. The transmitted light is detected on a detector 36, which outputs the signal level 37 to the device control system 39. The operative switching pixels of the array are shown in the continuation 38 of the liquid crystal element, each having its own applied voltage, generated in the control system 39.

According to other various preferred embodiments of this invention, the probe laser can be applied to the monitor pixel elements either from a fiber collimator driven directly from the output fiber of the laser, or by means of free space propagation from the laser through the monitor pixel, or as one of the supervisor wavelength channels of the system. The detector itself can preferably be fiber based or a free-space detector, or can be part of the control monitoring module of the communication system.

A number of alternative and preferable sources, generally laser sources, can be used for implementing these embodiments of the present invention. In the first place, the source can be either part of the device, or adjacent to the device such as inside the module into which the device is built, or it can be completely remote, such as could be supplied by the communication network provider for channel monitoring.

Figure 7:
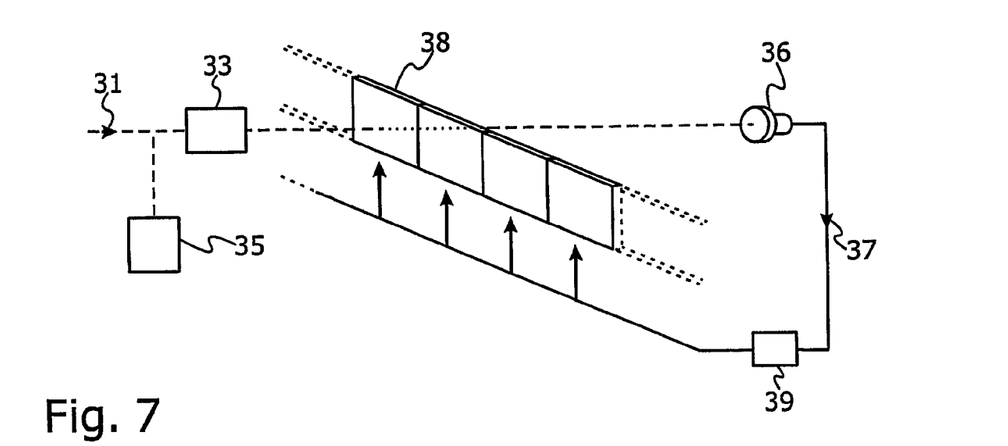
FIG. 7 illustrates schematically a system incorporating a multi-pixel wavelength sensitive switch, such as that shown in FIG. 6, but with the monitor source externally provided by the communication network provider, such as an OSC or OCM channel of predetermined wavelength.

Reference is now made to FIG. 7, which illustrates a system, according to another preferred embodiment of the present invention, incorporating a multi-pixel wavelength sensitive switch 38 such as that shown in FIG. 6, but with the monitor source 31 externally provided by the communication network provider, such as an OSC or OCM channel of predetermined wavelength. In such a system, a separate monitor element is not required, and the externally input monitor channel is directed through the pixel relevant for its wavelength by the regular dispersive function 33 of the device. Since the input power of this channel is not generally known accurately, because of transmission attenuation before input to the device, the input power is preferably measured by means of an input power monitor 35. After transmission through the relevant pixel, the monitor channel light is detected on the monitor detector 36, which in this embodiment can preferably be the OSC or OCM detector, reading the power through the pixel of that wavelength. Alternatively and preferably, it can be the dedicated monitor channel detector, as in FIG. 6. The output power level signal 37 is directed into the control system 29, where the transmission of the monitor signal is determined in relation to the input signal measured on the input power monitor 35, and the correct drive voltage determined for any of the other wavelength channels of the device, as explained hereinabove. Alternatively and even more preferably, in order to provide greater accuracy by eliminating the effect of the insertion loss of components besides the liquid crystal element itself, it is possible to use only the output detector for determining a normalized value of the transmission of the monitor signal as a function of applied pixel voltage. The value of the output power as a function of drive voltage will vary from a minimum, representing minimum transmission when the switch is closed, to a maximum value when the switch is open. By plotting the output as a percentage of the maximum output, a normalized T/V curve can be measured, which can then be used to determine the required pixel voltage for any other wavelength, as described above in relation to the method of use of equations (3) to (5) and their B/V curves. In all of the above-described systems using an external monitor source, since the predetermined wavelength of the monitor channel provide by the system provider is generally very stable and accurate, the temperature compensation can be achieved very accurately.

If the probe laser source is an internally provided source, then there are a number of different alternative preferred types which can be used, each type having an impact on the cost, complexity and accuracy of the temperature compensating device. The lowest cost solution is the use of a Fabry-Perot diode laser, but the temperature stability of such an unstabilized F-P laser is generally of such a low level that it would largely reduce the advantages obtained by its use in the present invention for temperature compensation of a birefringent pixelated phase shifter device, and this limitation must therefore be overcome. One method of using a simple F-P laser of this type is to measure its temperature, and determine the wavelength from a calibration curve provided by the manufacturer, as will be shown below in FIG. 8.

More preferably, the laser is temperature stabilized by means of a thermo-electric heating and cooling device, such that the monitor wavelength is kept more constant. Such a thermoelectric heating and cooling device for a laser is smaller and less costly than one for maintaining the entire liquid crystal array stabilized, and this solution thus provides the advantages of full temperature stabilization of the device at a lower cost and power requirement.

The next level of accuracy is provided by the use of a Distributed Feedback laser (DFB), which generally has a lower temperature dependence than a simple Fabry-Perot (FP) diode laser, and may obviate the need for temperature stabilization of the laser, but such lasers are significantly more expensive than FP lasers. The most accurate, but also the most costly laser source for use in this application, is a temperature stabilized DFB, using a thermo-electric cooler/heater module for the laser alone. Such lasers can generally fully exploit the advantages of the present invention in compensating for temperature changes.

The above embodiments have been described using a monitor probe source 30 having a predetermined nominally fixed wavelength output. According to further preferred embodiments of the present invention, the probe beam source, 30, may be a tunable light source, preferably a tunable laser source. In operation of the device, this source is first tuned to a first wavelength $\lambda_1$ generally within the range of coverage of the pixelated liquid crystal phase-shift switching device, and the transmission T of the monitor element measured over a range of drive voltages, V, thus generating a T/V curve for $\lambda_1$. This process is repeated sequentially for a number of discrete wavelengths, which should be generally spaced over the entire range of wavelengths covered by the pixelated liquid crystal phase-shift switching device, and a T/V curve measured for each of the wavelengths chosen. The chosen wavelengths need not be identical to the center wavelengths of the pixels of the switching device. However, the range of wavelengths covered should be approximately similar to that of the device. This set of T/V curves is stored in the system memory as a reference T/V matrix set, recorded at the temperature of measurement. An example of such a T/V matrix is shown in table I below, where the transmission T is measured at a series of wavelengths, $\lambda_i$, as a function of drive voltage $V_j$ applied to the monitor pixel.

TABLE 1

|  | $\lambda_1$ | $\lambda_2$ | $\lambda_3$ | ... | $\lambda_m$ |
|---|---|---|---|---|---|
| $V_a$ | $T_{1a}$ | $T_{2a}$ | $T_{3a}$ | ... | $T_{ma}$ |
| $V_b$ | $T_{1b}$ | $T_{2b}$ | $T_{3b}$ | ... | $T_{mb}$ |
| $V_c$ | $T_{1c}$ | $T_{2c}$ | $T_{3c}$ | ... | $T_{mc}$ |
| ... | ... | ... | ... | ... | ... |
| $V_n$ | $T_{1n}$ | $T_{2n}$ | $T_{3n}$ | ... | $T_{mn}$ |

Since the probe pixel and the pixels of interest are situated in the same environmental conditions, the T/V matrix measured on the probe pixel and stored in the system memory, can be used for directly determining for any of the pixels of interest of the wavelength selective device, the correct voltage to apply to obtain a desired transmission level. If the wavelength channel of interest does not fall exactly at one of the measured wavelengths, then in order to determine the correct voltage to be applied to the wavelength pixel of interest, an interpolation may be made between the wavelengths actually measured and stored in the T/V matrix, using the relationship between wavelengths and phase shift given in equation (1) above, and the calculations described using equations (3) to (5) and the B/V curves described above.

Alternatively and preferably, if the tunable source has sufficient wavelength resolution, then the plotted T/V curves can be arranged to be at the center wavelengths of the pixels of the wavelength selective switch, and the results stored in a look-up table in the system memory. By this means, the required voltage can be directly withdrawn from the system memory for any of the pixel wavelengths. If all of the pixels cannot be covered, for any reason, such as insufficient memory to store curves for all of the pixels, then T/V curves at the center wavelengths of some of the pixels can be plotted, and interpolation used for the other pixels.

The above described measurement procedure on the monitor element is repeated periodically, and the latest measurement set is used to replace the previously measured set stored in memory, such that the stored T/V matrix always characterizes the device performance at the temperature of the latest measurement set. In this way, the set of T/V curves stored in the system memory is arranged to track changes in the temperature of the device. The frequency at which new reference sets of T/V curves need to be measured is dependent on the rate at which the temperature of the device is expected to change, so that the more stable the ambient temperature, the less frequent the need to remeasure a T/V matrix set, As with the previously described, fixed wavelength embodiments of the present invention, this preferred method of operation is also capable of being implemented using a number of different laser sources. The most accurate method is to use an externally provided laboratory tunable laser, but such a source is cumbersome to use and generally physically incompatible for integration with fiber optical circuit modules.

Figure 8:
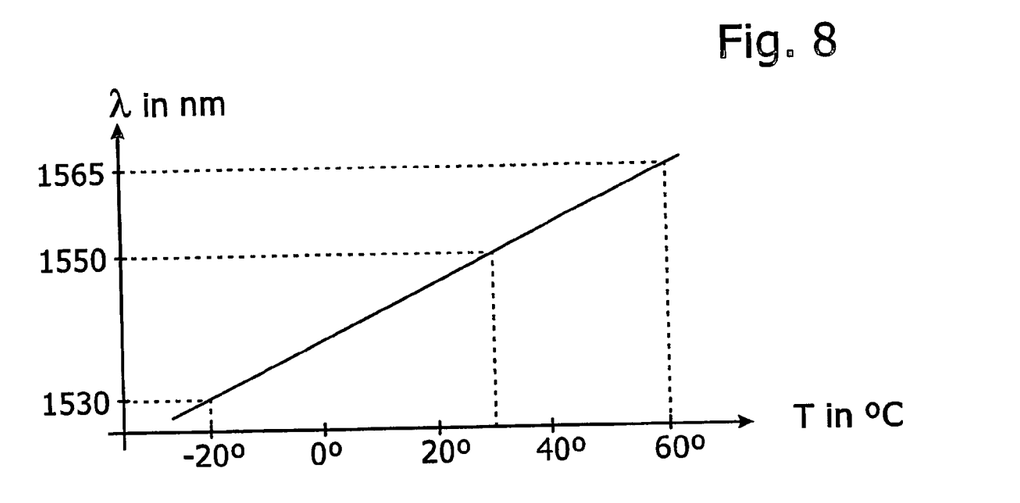
FIG. 8 is a schematic graphical representation of the typical variation of output wavelength from the nominally tuned output wavelength of a low cost Fabry-Perot laser diode, as a function of temperature of the laser diode.

The currently available, lowest cost type of laser source, which is practically compatible with the requirements of this embodiment is probably a Fabry-Perot diode laser, tunable over the required wavelength range by adjustment of its temperature using a thermoelectric cooling and heating module. Reference is now made to FIG. 8, which is a schematic graphical representation of the typical variation of output wavelength of such a low-cost FP laser diode, as a function of the temperature of the laser diode. Such a temperature calibration graph, or an equivalent chart, is provided with the laser itself by the manufacturer, and is relatively accurately known within the limits of the production variations. According to this preferred embodiment of the present invention, a temperature measurement device such as a thermocouple or a thermistor is provided on the F-P diode laser, and use is made of the supplied temperature calibration information in order to determine the output wavelength of the laser at each tuned point with sufficient accuracy for use as the light source in the monitor element of the present invention. Alternatively and preferably, a temperature controlling device, such as a thermoelectric heating and cooling device, can be used for generating and controlling the temperature of the F-P diode laser, and thus to tune the laser. As previously mentioned, such a thermo-electric heating and cooling device for the laser diode alone is smaller and less costly than a thermoelectric heating and cooling device for controlling the temperature of the entire switching device.

Figure 9:
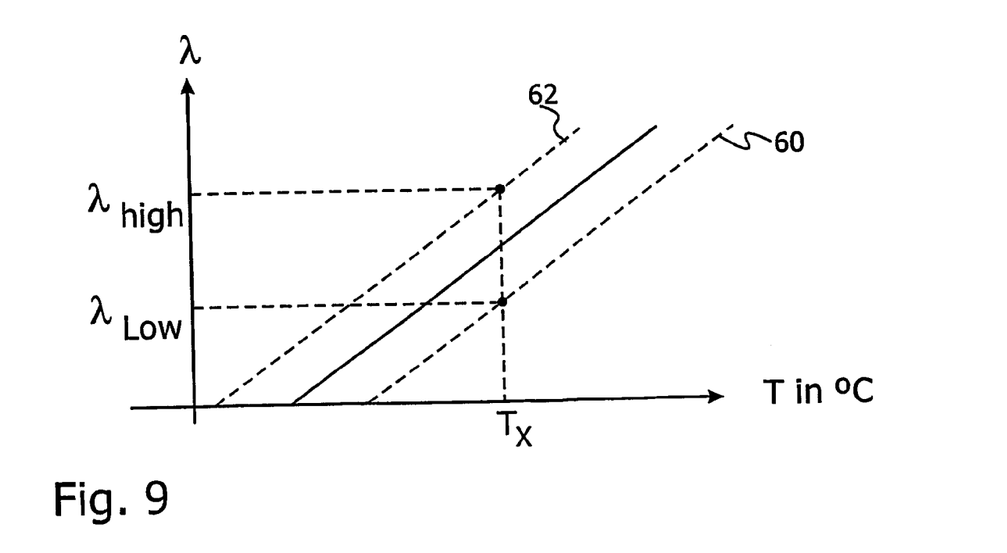
FIG. 9 is similar to the graph shown in FIG. 8, but illustrating schematically the production variations between different lasers with nominally the same temperature dependence curves.

The accuracy of a temperature compensating switching device using such a temperature controlled Fabry-Perot laser is limited by the accuracy with which the temperature compensating curve is known. As mentioned above, this may be limited by the production spread between nominally identical lasers. Reference is now made to FIG. 9, which is similar to the graph of FIG. 8, but illustrating schematically the above-mentioned production variations between different lasers from the same manufacturer with nominally the same temperature dependence curves. As is observed, this production spread between lasers, such as that shown in curve 60 and that in curve 62 may result in inaccuracy in the determination of the true wavelength used in the temperature compensation methods of the present invention, since even if the temperature is determined as described in the previous embodiment of FIG. 8, it is not known which of the curves between curve 60 and 62 is the correct one for the particular laser in use. Thus, at a given temperature $T_x$, the true wavelength can vary between $\lambda_{high}$ and $\lambda_{low}$.

Figure 10:
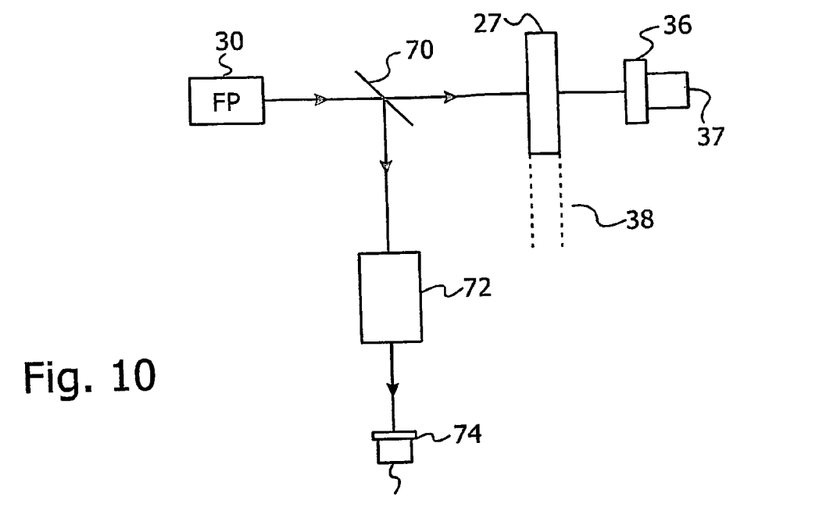
FIG. 10 illustrates schematically a further improvement of the embodiment of FIG. 6, using an etalon to compensate for the production spread uncertainty illustrated in the graph of FIG. 9, and for determining the exact wavelength.

Reference is now made to FIG. 10, which illustrates schematically a further improvement of the above-described preferred embodiment of the present invention, by which compensation can be made even for the production spread uncertainty illustrated in the graph of FIG. 9, such that the comparatively lower cost F-P lasers can be used in this application, while achieving a high level of accuracy. The probe source 30 is preferably a Fabry-Perot diode laser, tunable by means of temperature change over the desired range of the temperature compensation device, which directs its output through the monitor pixel 27 for detection by detector 36, as in the embodiment of FIG. 6. The embodiment of FIG. 10 differs from that of FIG. 6 by the addition of a partially reflective mirror 70, which splits off a small part of the incident monitor beam. This beam sample passes through an etalon 72 having a central wavelength at a predefined position within the wavelength range of the laser, and is then detected by a second detector 74. The laser is tuned until the known center wavelength of the etalon 72 is detected by means of the light level transmitted through it, and at the same time, the temperature of the laser 30 is recorded. Once the temperature and the wavelength are definitively known for any particular tuning point of the laser, and assuming that the slope and linear function characteristic of the laser are known, the correct temperature dependence curve of FIG. 9 for that particular laser is thus known, and a true curve can thus be used for performing the previously described temperature compensation accurately, even with a comparatively low-cost F-P diode laser.

As with the above-described embodiments in which a fixed wavelength source is used, the accuracy of the presently described embodiments using the tuned source method can be improved by use of a DFB laser with a temperature controller to control the temperature. The tuning range of such a laser is less than that of a temperature controlled F-P laser, and the cost is higher, but the accuracy of the resulting temperature compensating device is improved.

Use can also be made in these multiple wavelength embodiments of the present invention, of a number of externally provided monitor channels from the system provider, such as OSC/OCM channels, spaced at intervals over the wavelength bands of the device which it is required to temperature compensate. In this preferred embodiment, several of the internal pixels of the wavelength selective switching device are used for monitoring the different monitor wavelength beams, each according to the wavelength of the monitor channels provided and used. As with the previously described fixed wavelength embodiment of FIG. 6, this method is also very accurate, but requires interfacing with the external network provider, and additional knowledge of the monitor beam powers or their measurement.

Figure 11:
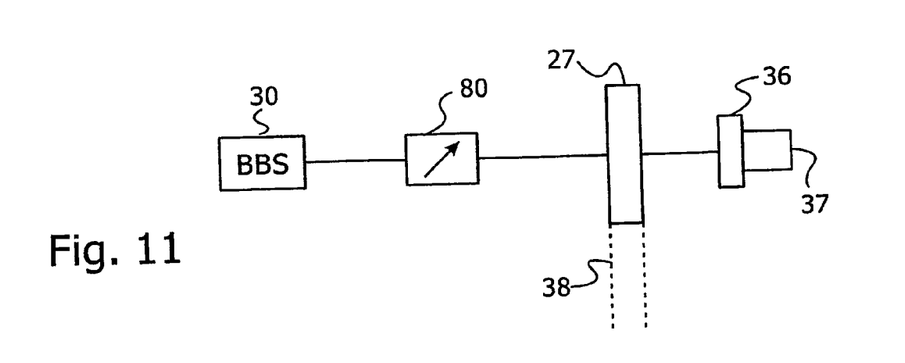
FIG. 11 is a schematic drawing of a further preferred embodiment of the temperature compensation device of the present invention, using a broad band source and a tuned filter as the probe beam source.

Reference is now made to FIG. 11, which is a schematic drawing of a further preferred embodiment of the temperature compensation device of the present invention, suitable for performing the above-described variable wavelength method of operation. In this embodiment, the probe source 30 is preferably a broad band source, such as a LED, and hence significantly less costly than the tunable diode laser sources described in the previous embodiments. The specific probe wavelength is tuned and selected by means of a tunable filter 80, disposed between the probe source 30 and the monitor pixel 27, such that only a narrow wavelength beam at the filter's passband wavelength is transmitted. As the filter is tuned, the probe beam is swept across the range of wavelengths required to perform temperature compensation of the birefringent phase shifter, as described in the tuned laser embodiments above. Any suitable form of tuned filter 80 known in the art may be used, whether mechanically or electrically tuned.

Figure 12:
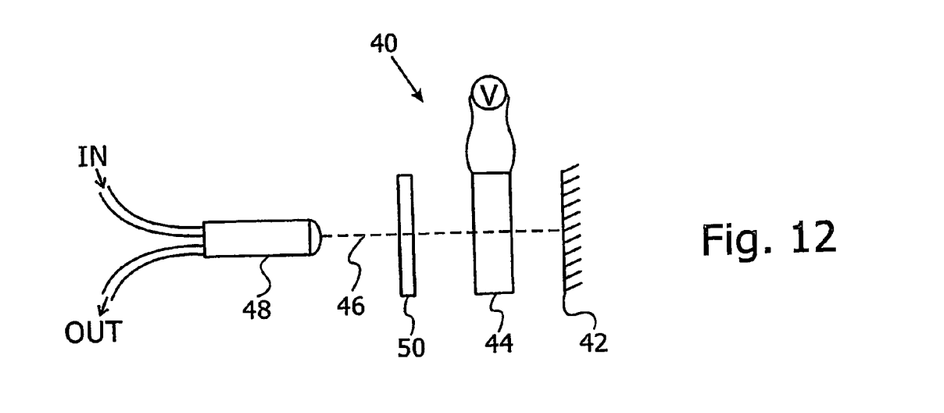
FIG. 12 illustrates schematically a one-dimensional reflective pixelated liquid crystal switching element, constructed and operative according to another preferred embodiment of the present invention.

Although all of the above described preferred embodiments of the present invention are shown as transmission switching devices, it is to be understood that the same dynamic monitoring processes can be applied for use in a reflective switch structure. Reference is thus made to FIG. 12, which schematically illustrates from a side view, a one-dimensional reflective pixelated liquid crystal switching device 40, constructed and operative according to another preferred embodiment of the present invention. The switching elements are similar in operation to those shown in FIGS. 4 and 5, except for the addition of a reflective surface 42 behind the liquid crystal elements 44, preferably both for the monitor pixels and for the wavelength channel switch pixels. The laser probe beam 46 is input preferably by means of a dual fiber collimator 48, and the reflected light passes back through the LC element, and is preferably output to the monitor detector through the second fiber of the dual beam collimator. In this embodiment, as is known in the art, the LC element is such as to provide a phase shift of $\pi/2$ in each traverse such that the applied voltage required for complete blocking is $V_{\pi/2}$, instead of $V_\pi$ as in the transmissive embodiments above. The polarizing plate 50 is also different from that used in the transmissive embodiments, being a quarter wave plate instead of a half wave plate. The view in FIG. 12 is taken across the monitor pixel optical path, such that it is understood that a probe laser and detector are connected to the input and output of the dual-fiber collimator. For the wavelength switching pixels, the input and output would generally be free space dispersed optical signals undergoing the switching action, as is known in the art.

Additionally, besides its function in dynamic temperature compensation, any of the monitor pixel(s) embodiments of the present invention can also preferably be used as a hazard indicator, which provides a signal to the control system to indicate that the entire liquid crystal device, with its voltage drivers, is operational.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

We claim:

1. An optical device comprising:
   a plurality of birefringent phase shifter elements electrically controlled by applied drive voltages, the phase shift generated in an element for a given drive voltage being generally dependent on environmental conditions present;
   a probe optical beam of predefined wavelength, said probe optical beam being directed through at least one of said birefringent phase shifter elements operative as a monitor element;
   a detector for determining the transmission of said probe optical beam through said monitor element as a function of said drive voltage applied to said monitor element; and
   a controller utilizing an output of said detector to produce a predetermined phase shift in at least another one of said birefringent phase shifter elements.

2. The device according to claim 1 and wherein said predetermined phase shift produced in said at least other one of said birefringent phase shifter elements has reduced dependence on said environmental conditions.

3. The device according to claim 1 and wherein at least one of said birefringent phase shifter elements is a liquid crystal element.

4. The device according to claim 1 and wherein said plurality of birefringent phase shifter elements are disposed on a substrate, and said monitor element is disposed on the same substrate.

5. The device according to claim 1 and wherein said monitor element is disposed on a separate substrate to that of said plurality of birefringent phase shifter elements.

6. The device according to claim 1 and wherein said environmental conditions include at least the ambient temperature of the optical device.

7. The device according to claim 1 and wherein said phase shift generated in said birefringent phase shifter element is operative to control the transmission of said element according to said drive voltage applied thereto.

8. The device according to claim 1 and wherein said detector is disposed opposite to the side of impingement of said probe optical beam on said monitor element, such that said optical device is transmissive.

9. The device according to claim 8 and wherein said drive voltage applied to said element is predetermined to cause said phase shift to be $\pi$ essentially independently of said environmental conditions.

10. The device according to claim 1 and also comprising a reflecting surface disposed opposite to the side of impingement of said probe optical beam on said at least one monitor element, such that said optical device is reflective.

11. The device according to claim 10 and wherein said drive voltage applied to said element causes said phase shift to be $0.5\pi$ essentially independently of said environmental conditions.

12. The device according to claim 1 and wherein said probe optical beam of predefined wavelength is produced by a laser.

13. The device according to claim 12 and wherein said laser is a tunable laser.

14. The device according to claim 12 and also comprising an etalon disposed such that an output wavelength of said laser is determined accurately for at least one given laser temperature.

15. The device according to claim 12 and wherein said laser has a known relationship between wavelength and laser temperature, and wherein the temperature of said laser is measured such that its output wavelength is known.

16. The device according to claim 12 and wherein said laser has a known relationship between wavelength and laser temperature, and wherein said laser is temperature controlled such that its output wavelength is known.

17. The device according to claim 1 and wherein said probe optical beam of predefined wavelength is produced by a broadband source with a tunable bandpass filter disposed serially in its output optical path.

18. The device according to claim 1 and wherein said probe optical beam of predefined wavelength is derived remotely from said device.

19. The device according to claim 18, and wherein said probe optical beam of predefined wavelength is provided by means of a communication network monitor channel.

20. The device according to claim 1 and wherein said detector for determining the transmission of said probe optical beam through said monitor element is located remotely from said device.

21. The device according to claim 20, and wherein said detector for determining the transmission of said probe optical beam through said monitor element is a communication network monitor channel detector.

22. A method of dynamically compensating for the effect of an environmental condition on an optical phase shifter device, comprising the steps of:
   (a) providing at least one birefringent phase shifting element, electrically controlled by an applied drive voltage, the phase shift generated in said element for a given drive voltage being generally dependent on said environmental condition present;
   (b) providing at least one monitor birefringent phase shifting element controlled by a monitor drive voltage, said at least one monitor element experiencing essentially the same environmental condition as said at least one birefringent phase shifting element;
   (c) measuring a relationship between said monitor drive voltage and the transmission through said at least one monitor element for a predetermined wavelength; and
   (d) determining from said relationship, the drive voltage required by said at least one birefringent phase shifting element, to obtain a desired optical transmission for a wavelength other than said predetermined wavelength.

23. The method according to claim 22, wherein said step of determining from said relationship is performed by calculating a set of said relationships between said monitor drive voltage and the transmission through said at least one monitor element for a plurality of wavelengths different from that of the predetermined wavelength.

24. The method according to claim 23, wherein said step of calculating a set of relationships between said monitor drive voltage and the transmission through said at least one monitor element for a plurality of wavelengths different from that of the predetermined wavelength is performed by utilizing a linear relationship between the phase shift generated in said at least one birefringent phase shifter element and the wavelength of light traversing said element.

25. The method according to claim 24, wherein said transmission through said at least one monitor element is determined from said phase shift generated in said at least one birefringent phase shifter element by use of the functional relationship between the transmission through said birefringent element and the birefringence phase shifting effect on light transmitted therethrough.

26. The method according to claim 22 and wherein said desired optical transmission through said at least one birefringent phase shifter element is produced essentially independently of said environmental condition.

27. The method according to claim 22 and also comprising the step of periodical repetition of steps (c) and (d) to compensate for changes in said environmental condition occurring between said periodical repetitions.

28. The method according to claim 22 and wherein at least one of said at least one birefringent phase shifter element, and said at least one monitor element, is a liquid crystal element.

29. The method according to claim 22 and wherein said environmental condition is at least the ambient temperature of said optical device.

30. A method of dynamically compensating for the effect of an environmental condition on an optical phase shifter device, comprising the steps of:
(a) providing at least one birefringent phase shifting element, electrically controlled by an applied drive voltage, the phase shift generated in said element for a given drive voltage being generally dependent on said environmental condition present;
(b) providing at least one monitor birefringent phase shifting element controlled by a monitor drive voltage, said at least one monitor element experiencing essentially the same environmental condition as said at least one birefringent phase shifting element;
(c) measuring relationships between said monitor drive voltage and the transmission through said at least one monitor element for a plurality of predetermined wavelengths; and
(d) using said relationships to determine the drive voltage required by said at least one birefringent phase shifting element, to obtain a desired optical transmission for any desired wavelength within the range of said plurality of wavelengths.

31. The method according to claim 30, wherein said desired wavelength is one of said plurality of predetermined wavelengths.

32. The method according to claim 30, wherein said desired wavelength is not one of said plurality of predetermined wavelengths, and said desired optical transmission is determined by calculation from at least one of said relationships at at least one of said predetermined wavelengths.

33. The method according to claim 30 wherein said desired optical transmission through said at least one birefringent phase shifting element is produced essentially independently of said environmental condition.

34. The method according to claim 30 and also comprising the step of periodical repetition of steps (c) and (d) in order to compensate for changes in said environmental condition occurring between said periodical repetitions.

35. The method according to claim 30 and wherein at least one of said at least one birefringent phase shifting element, and said at least one monitor element, is a liquid crystal element.

36. The method according to claim 30 and wherein said environmental condition is at least the ambient temperature of said optical device.

* * * * *